United States Patent Office 3,477,696
Patented Nov. 11, 1969

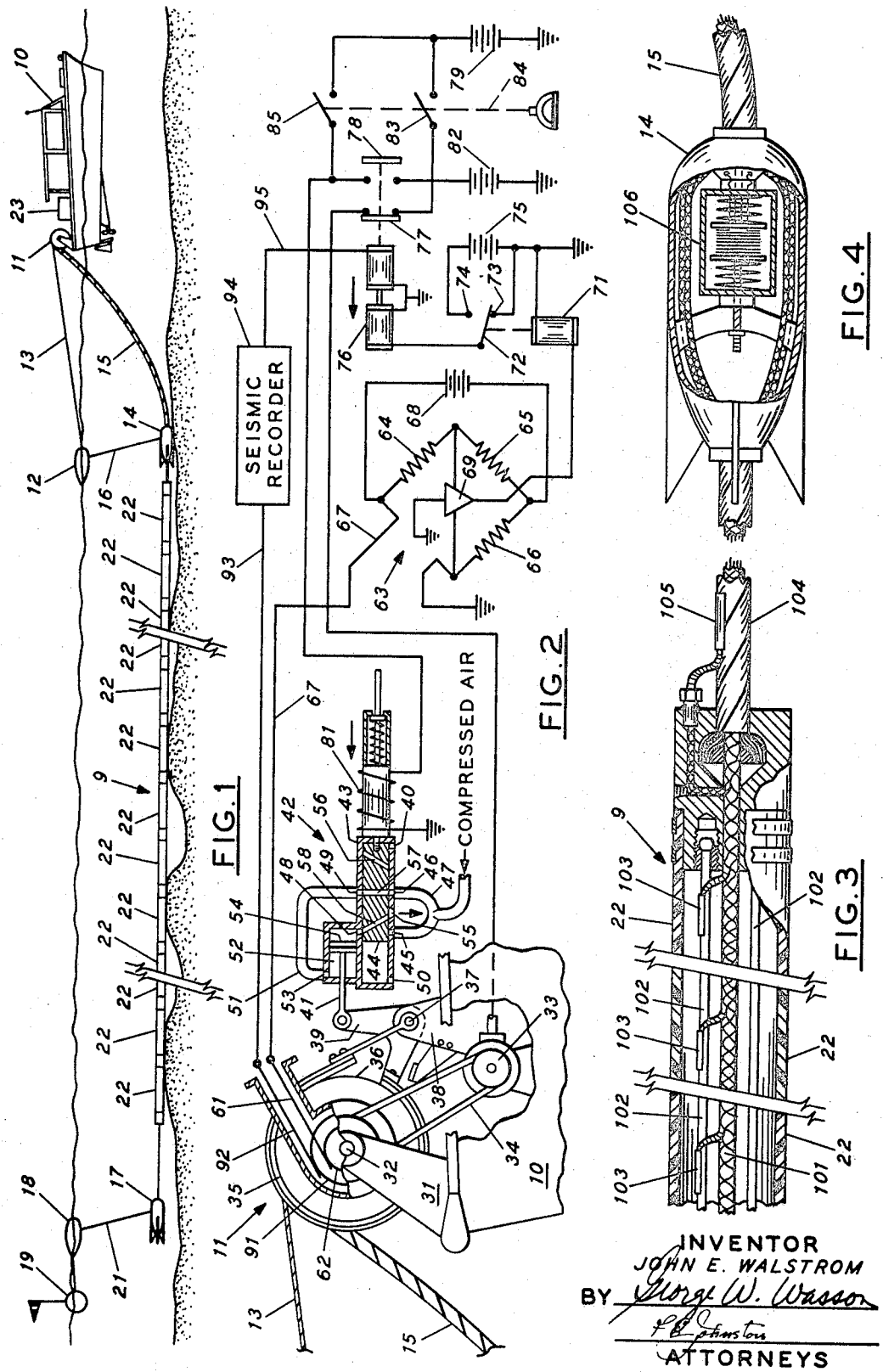

3,477,696
OFFSHORE SEISMIC CABLE STRESS SENSING SYSTEM
John E. Walstrom, Orinda, Calif., assignor to Chevron Research Company, San Francisco, Calif., a corporation of Delaware
Continuation-in-part of application Ser. No. 627,878, Apr. 3, 1967. This application Apr. 17, 1968, Ser. No. 722,069
Int. Cl. B66d 1/48
U.S. Cl. 254—173                              1 Claim

ABSTRACT OF THE DISCLOSURE

A sensing device is positioned adjacent to and in sensing contact with a seismic cable adapted to be towed submerged behind a boat. On the occurrence of abnormal stress in or near the cable at the sensing device a signal is transmitted to the tow boat to cause loosening of a loosenable connection between the boat and cable. The sensing device may be a strain gauge or an acceleration responsive element and may be operative while the cable is being reeled in or while it is being towed behind the tow boat.

---

This application is a continuation-in-part of my copending application Ser. No. 627,878, filed Apr. 3, 1967, now Patent No. 3,381,940.

This invention relates to a method and apparatus for protecting offshore seismic cables towed below the surface of the water and in possible contact with the bottom or debris below the water surface. More particularly, the invention relates to a method and apparatus for controlling the mechanisms supported on the tow boat that control the movement of the seismic cable through the water.

This application is a continuation-in-part of copending application Ser. No. 627,878, filed Apr. 3, 1967, now Patent No. 3,381,940, for "High-Speed Well Logging System." In the parent application method and apparatus are disclosed for permitting an increase in the speed of hoisting a well logging tool through a well bore. In that application a sensing device is associated within the well bore with a well logging sonde and the sensing device is included in an electrical control circuit connected through the logging cable to the hoisting mechanism at the earth's surface. Strains detected within the well bore at the logging sonde are substantially instantaneously transmitted along the cable to the control of the hoisting mechanism. With the system disclosed in that application higher speeds may be employed in hoisting the well logging sonde through the well bore without concern for snapping the hoisting cable because the sensing device at the logging sonde can transmit substantially instantaneously the indication that the logging sonde has become lodged, and this transmitted signal may almost immediately interrupt the hoisting of the sonde.

The present invention is an extension of part of the concepts of the parent application into the offshore seismic exploration arts. In offshore seismic data collecting one or more long streamers of seismic cable are towed behind a tow boat at a controlled position. The cable is connected to recording mechanisms on the boat to permit the recording of signals reflected to the cable from seismic sources positioned with respect to the cable. While in general the seismic cable remains stationary during the actual collection of reflection signals, it is necessary to move the cable with respect to the underwater bottom between initiations of the seismic source as well as when the cable is reeled back into the boat. During these moving operations the cable may become snagged on the bottom or objects resting on the bottom in such a way that continued pulling on the cable could cause it to part. It is important that the occurrence of such snag should become apparent as soon as possible so that forces applied to the cable can be released to prevent parting of the cable. In accordance with the present invention the occurrence of stress or the occurrence of a snag along or adjacent to the cable is transmitted instantaneously to the tow boat where this signal may be used to interrupt the pull on the cable.

The objects and features of the invention will be readily apparent to those skilled in the art from the specification and appended drawings illustrating a preferred embodiment wherein:

FIGURE 1 shows a seismic cable in position to be used.
FIGURE 2 is a schematic and partially sectional view of the towing and control mechanisms connected to the seismic cable.
FIGURE 3 is a partially sectional view of a seismic cable illustrating one form of sensing mechanism associated with the cable.
FIGURE 4 is a partially sectional view illustrating an aternative embodiment of a sensing mechanism associated with the seismic cable.

As shown in FIGURE 1, a seismic cable 9 is towed behind a boat 10. A reel 11 on the boat 10 is attached to a buoy 12 by cable 13 and to a paravane 14 by cable 15. The reel 11 can be adapted to contain the two cables 13 and 15 on separate spools in positioning the seismic cable 9 adjacent to the underwater bottom. The paravane 14 is attached to the cable 15 and arranged to maintain a constant depth below the surface of the water by being connected by cable 16 to the buoy 12. A second paravane 17 at the other end of the cable 9 maintains the rear end of the cable at a constant level below the surface. A rear buoy 18 and marker buoy 19 are attached to the rear paravane 17 by a cable 21. Both cables 16 and 21 have a length determined by the depth at which the cable 9 is to be towed. The seismic cable, itself, consists of a number of sections 22 that contain seismic detectors and interconnecting conductors for transmitting signals from the detector sections through the cable 15 to a suitable seismic recorder 23 on the boat 10.

In operation, the cables 13 and 15 are reeled out from the reel 11 when the boat 10 is in the vicinity of the subsurfaces to be explored. The paravanes 14 and 17 are located at the desired depth below the surface of the water. The boat moves over the prospect at a slow rate of speed and a seismic source is detonated at a known position with respect to the cable 9. Signals from seismic detectors within the cable 9 are transmitted through the cable 15 to the boat 10, where they are recorded.

After each seismic detonation the cable is moved to another location along the area being explored to be appropriately positioned for the detection of additional seismic reflections from the detonation of additional seismic sources.

To improve the overall efficiency of the offshore seismic exploration operations it is desirable to move the cable as rapidly as possible from one location to another. Frequently more than one seismic cable is positioned behind the tow boat and one cable is moved while another is held stationary to detect seismic reflections. During these moving operations it is possible that the cable may become snagged or lodged along the underwater bottom. In that seismic cables are expensive devices, it is important that they should not be damaged on the occurrence of such a lodging or snagging.

FIGURE 2 illustrates schematically an electrical circuit and suitable apparatus for interrupting the pulling forces applied to the seismic cable as it is being towed or reeled behind the tow boat 10. As herein illustrated, the cables 13 and 15 are operatively connected to the reel 11. The reel 11 is supported on a frame 31 so as to be rotated about its axis 32 by an electrical motor 33 driving the reel through a belt 34. At the periphery of the reel a brake lining 35 engages a brake drum 36. One end of the brake lining is fixed at support 37 on frame 38 while the other end is fixed to a bell crank 39 pivotally supported on the frame 38 and connected at its free end to an operating rod 41. The brake lining 35 is engaged and disengaged from the brake drum 36 in accordance with the operation of an electrically operated pneumatic solenoid 42 including an element for moving the operating rod 41.

When the cable is in use for receiving seismic reflections the reel 11 is permitted to run free so that cable 15 is reeled out from the reel. At this time the brake lining 35 is disengaged from the drum 36. The brake lining 35 is also disengaged from the drum 36 when the cable 15 is being reeled into the boat. When the cable 15 is merely being towed a fixed distance behind the boat the brake lining 35 is engaged with the drum 36 to lock the reel 11.

When in this last-described condition, the control mechanism for the drive to the reel 11 is in the position as illustrated in FIGURE 2. As here illustrated, the electrically operated pneumatic solenoid 42 includes a housing 43 and an internal plunger 44. The external housing 43 has a pair of input ports 45 and 46 connected by pneumatic tubing 47 to a source of compressed air. A pair of output ports 48 and 49 are provided on the housing 43 with output port 49 connected by pneumatic tubing 51 to an operating chamber 52 at input port 53. The operating chamber 52 houses an operating plunger 54 connected to the operating rod 41 previously described. The housing 43 is further provided with a vent at 55 and bleeder vents 40 and 50 at opposite ends.

The plunger 44 is provided with three channels 56, 57 and 57 passing entirely through the plunger 44. These channels are adapted to connect certain of the input and output ports for control of the operating plunger 54.

In the position illustrated in FIGURE 2 the source of compressed air is connected through tubing 47 to port 46 and through channel 57 to output port 49. Tubing 51 connects the compressed air to input port 53 of operating chamber 52 so as to provide compressed air at the left-hand side of operating plunger 54. The chamber on the opposite side of the plunger 54 is connected through outlet port 48 through channel 58 to the vent 55. With the pneumatic solenoid in this position the brake lining 35 is in engagement with the brake drum 36.

When the brake lining and drum are engaged and the boat is moving, any snag of the cable 9 should become known instantly at the boat as for instance by a signal transmitted along the cable 15. That signal may be appropriately transmitted through brush 61 and slip ring 62 so as to provide a control signal to an electrical bridge circuit 63 at the boat. The bridge circuit constitutes elements 64, 65, 66 and the sensing element providing the signal on conductor 67. A power source 68 is connected across the bridge at the junction between elements 64 and the conductor 67 and the junction of elements 65 and 66. An amplifier 69 is connected across the bridge at the junction of elements 64 and 65 and the junction of element 66 and the ground connection. The output of the amplifier is supplied to a solenoid 71 for the operation of a movable contact 72 between stationary contacts 73 and 74. Contact 73 is connected to ground while contact 74 is connected to battery 75 and then to ground. The movable contact 72 is connected to one operating coil of a solenoid 76 providing mechanical movement of a pair of bridging contacts 77 and 78. Bridging contact 77 operates in a circuit between motor 33 and battery 79, and bridging contact 78 operates in a circuit between an electrical solenoid operating coil 81 and a battery 82. The circuit to motor 33 including bridge contact 77 further includes one pole 83 of a double-pole single-throw mechanically operated switch 84. The other pole 85 of the switch 84 provides an additional circuit between the battery 79 and the operating coil 81 of solenoid 42.

In addition to the operating mechanisms just described, seismic signals from the cable 9 are carried through the reel 11 and are supplied from slip ring 91 to brush 92 connected to multiconductor cable 93 and the seismic amplifier 94. The seismic amplifier may be a conventional multitrace recording device for recording the separate signals from individual or groups of seismic detectors in the cable 9. A suitable interlocking circuit is provided in the seismic recorder 94 to provide an energization signal on conductor 95 to a second operating coil of the solenoid 76. Both of the coils of the solenoid 76 initiate control of the motor 33 and the solenoid 42 as will be more fully described hereinafter.

FIGURE 3 illustrates one form of sensing mechanism that may be suitably associated with the cable 9 to provide the signal on conductor 67 to operate the mechanisms of FIGURE 2. As here illustrated, the cable 9 has a plurality of sections 22 each constituting an internal electrical conductor 101 connected to seismic detectors not herein illustrated. The cable has a plurality of internal strength members 102 to relieve the electrical cable from the force needed for towing the cable through the water. As here illustrated, the stress sensing devices constitute a plurality of independent strain gauges 103 connected in each section 22 to the strength members 102. Each of the strain gauges is electrically connected to conductors of the cable 101. The strain gauges may be connected in series throughout the entire cable 9 since only a single stress measurement need be made. The conductor connecting the strain gauges through the cable 101 passes on through connecting cable 104 and upwardly through the paravane 14 and cable 15 to the reel 11 at the boat 10.

An alternative position for the strain gauge is also illustrated in FIGURE 3 where a strain gauge 105 is connected between the first section 22 of the cable 9 and the lead cable 104 connected to the seismic cable.

FIGURE 4 illustrates an alternative form of sensing mechanism here constituting an accelerometer 106 within the paravane 14 connected by cable 15 to the boat 10. The accelerometer here illustrated should be sesitive only to horizontal changes in velocity in the direction of pull of the seismic cable 9 and should be insensitive to vertical movements of the cable. Again its signal will be connected through cable 15 to the sensing mechanisms at the boat 10.

The operation of the mechanism of the present invention should be apparent from the foregoing description of the circuit and its elements. Consider first the operations when the cable is being towed behind the boat but not being reeled onto reel 11. It should be apparent that any snag or obstruction of the cable 9 will cause deceleration or strain that can be sensed by elements 103 or 106 to cause a signal to be transmitted along cable 15 and conductor 67 to the bridge circuit 63. This stress signal will unbalance the bridge to cause a signal to be supplied to amplifier 69 for the energization of solenoid 71. That energization will move contact 72 into connection with contact 74 to energize one winding of the solenoid 76 so as to open the circuit bridged by bridging contact 77 and to close the circuit with bridging contact 78. The operation of these two bridging contacts will respectively open the circuit to motor 33 so as to prohibit energization of motor 33 for rotation of the reel 11 and close the circuit to operating coil 81 of solenoid 42 to release the brake lining 35 from drum 36. Energization of the coil 81 moves the plunger 44 to align channel 57 with input port 48 so as to supply compressed air to the righthand side of the plunger 54 in chamber 52 to cause operating rod 41 to be moved toward the left. The same movement of the plunger will align channel 56 with tube 51 and exhaust port 55 so as to permit air from the lefthand side of the chamber 52 to be discharged through tube 51 and port 49.

When the cable is being reeled onto reel 11, contacts 83 and 85 of switch 84 will be closed to energize the motor 33. Any stress sensed in the cable will provide the same signals to bridge 63 to cause energization of solenoids 71 and 76. Energization of solenoid winding 76 will interrupt the circuit to motor 33 through bridging contact 77. Winding 81 of solenoid 42 will have been energized through contacts 85 so that the brake lining 35 and brake drum 36 will have been disengaged.

A third operating condition occurs when the cable 9 is permitted to drift behind the boat during the collection of seismic reflections. During that operation the seismic recorder 94 will be energized and will supply a signal on conductor 95 to energize the second winding of solenoid 76. While seismic signals are being recorded the circuit to motor 33 through bridging contact 77 will be open and the circuit to the solenoid 42 through bridging contact 78 will be closed. The cable cannot therefore be reeled and the brake will be released to permit the cable to run free behind the boat.

While certain preferred embodiments of the invention have been specifically disclosed, it should be understood that the invention is not limited thereto as many variations will be readily apparent to those skilled in the art.

I claim:
1. In an assembled offshore seismic cable adapted to be pulled behind a tow boat at the end of a predetermined length of tow cable on or over the underwater bottom of the body of water, the improvement comprising:
   (a) a loosenable connection between said boat and said tow cable allowing said tow cable to be loosened from said boat but now completely released, and means for loosening said loosenable connection.
   (b) said assembled seismic cable constituting a plurality of seismic cable sections assembled as an elongated cable,
   (c) sensing means incorporated into said seismic cable sections adapted to sense an abrupt change in stress within said seismic cable,
   (d) said incorporated sensing means constituting a plurality of strain gauges for individually sensing stress along said assembled seismic cable,
   (e) and means for transmitting a signal from any of said sensing means to said means for loosening said loosenable means, whereby sensing of an abrupt change in stress within any of said seismic cable sections instantly causes loosening of said loosenable means.

References Cited
UNITED STATES PATENTS

| | | | |
|---|---|---|---|
| 1,433,079 | 10/1922 | Jett | 254—172 |
| 2,280,932 | 4/1942 | Schaelchin | 254—172 |
| 3,282,568 | 11/1966 | Shuster | 254—172 |
| 3,381,940 | 5/1968 | Walstrom | 254—172 |

HARVEY C. HORNSBY, Primary Examiner

U.S. Cl. X.R.
166—65; 254—187